United States Patent
Papageorgiou et al.

(10) Patent No.: US 7,379,439 B2
(45) Date of Patent: *May 27, 2008

(54) METHOD AND APPARATUS FOR FAST W-CDMA ACQUISITION

(75) Inventors: Andrew Papageorgiou, Cambridge (GB); Diego Giancola, Cambridge (GB); Gerald Williams, Cambridge (GB)

(73) Assignee: UbiNetics Limited (GB)

( * ) Notice: Subject to any disclaimer, the term of this patent is extended or adjusted under 35 U.S.C. 154(b) by 683 days.

This patent is subject to a terminal disclaimer.

(21) Appl. No.: 10/473,930

(22) PCT Filed: Apr. 2, 2002

(86) PCT No.: PCT/GB02/01566

§ 371 (c)(1),
(2), (4) Date: Oct. 3, 2003

(87) PCT Pub. No.: WO02/082678

PCT Pub. Date: Oct. 17, 2002

(65) Prior Publication Data

US 2004/0100935 A1    May 27, 2004

(30) Foreign Application Priority Data

Apr. 4, 2001    (GB) ................. 0108506.7

(51) Int. Cl.
H04B 7/216    (2006.01)

(52) U.S. Cl. .................... 370/335; 370/342

(58) Field of Classification Search ........ 370/335, 370/342, 503, 509; 375/145, 149; 455/434
See application file for complete search history.

(56) References Cited

U.S. PATENT DOCUMENTS

| 5,950,131 | A | 9/1999 | Vilmure |
| 6,741,578 | B1 | 5/2004 | Moon et al. |
| 2001/0021200 | A1* | 9/2001 | Rudolf ................. 370/503 |
| 2004/0146026 | A1* | 7/2004 | Williams et al. ........ 370/335 |
| 2005/0063316 | A1* | 3/2005 | Giancola et al. ....... 370/254 |

FOREIGN PATENT DOCUMENTS

| EP | 0654913 | A2 | 11/1994 |
| EP | 0851611 | A2 | 9/2000 |
| EP | 1081976 | A2 | 3/2001 |
| EP | 1085776 | A | 3/2001 |
| JP | H11-502685 | | 3/1999 |
| JP | 2000-209630 | | 7/2000 |
| JP | 2000-312627 | | 10/2000 |
| JP | 2001-054156 | | 2/2001 |
| JP | 2002-094415 | | 3/2002 |
| JP | 2002-124906 | | 4/2002 |

(Continued)

Primary Examiner—Lee Nguyen
(74) Attorney, Agent, or Firm—Kilpatrick Stockton LLP (57) ABSTRACT

A method of classifying a ray is disclosed, the ray being received at a code division multiple access receiver. The method comprises: determining if a timing characteristic of the ray falls within a predetermined range of a timing characteristic of a ray classified to a given cell; in response to a positive determination, mixing a received signal with a scrambling code used by the given cell to provide a mixed signal; and examining the mixed signal to determine if the ray originates from the given cell.

21 Claims, 8 Drawing Sheets

FOREIGN PATENT DOCUMENTS

| | | |
|---|---|---|
| JP | 2002-165275 | 6/2002 |
| JP | 2002-186009 | 6/2002 |
| JP | 2002-543737 | 12/2002 |
| WO | WO 99/41854 | 8/1999 |
| WO | WO 00 55992 A | 9/2000 |
| WO | WO 00 67399 A | 11/2000 |

\* cited by examiner

METHOD AND APPARATUS FOR FAST W-CDMA ACQUISITION

This invention relates to apparatus for, and methods of, classifying a ray received at a code division multiple access receiver.

The proposed universal mobile telephone system (UMTS) will use code division multiple access (CDMA) to communicate on both uplink and downlink communications between node Bs and user equipment (UE). Downlink communications (node B to UE) will have a scrambling code, specific to the particular node B, modulated thereon. However, each slot of each frame (there will be fifteen slots in each frame) of downlink communications is proposed to commence with a 256 chip universal word, which is not modulated with the scrambling code. This universal word is the same for every slot of every frame, and its repeated transmission is hereafter referred to as the primary synchronisation channel (PSCH). UEs can detect node Bs, or cells, by detecting the PSCH without any knowledge of the identity or location of the node B, its scrambling code or its timing. However, all the information that can be gleaned from the PSCH is the slot timing. Frame timing, node B identity and scrambling code information is not available from the PSCH channel.

It is proposed to transmit a secondary synchronisation channel (SSCH), on which a sequence of secondary synchronisation codes (SSCs) are transmitted. The SSCs are transmitted for the first 256 chips of the fifteen slots in a frame. The sixteen different SSCs are constructed from position wise multiplication of a Hadamard sequence with a given sequence Z. The SSCs are orthogonal to the primary synchronisation code (PSC) and are almost orthogonal to the primary scrambling codes. There are 64 different SSC sequences proposed to be used in UMTS.

A UE will be able, for a ray corresponding to a signal received from a cell, to detect the SSC sequences of a received signal corresponding to the ray for fifteen consecutive slots, and from this determine the scrambling code group and the frame timing using a look-up table. The received signal will then be correlated against each of eight scrambling codes which form the scrambling code group, and the scrambling code identified by detecting a high degree of correlation from one of the resulting signals.

Figure 1:
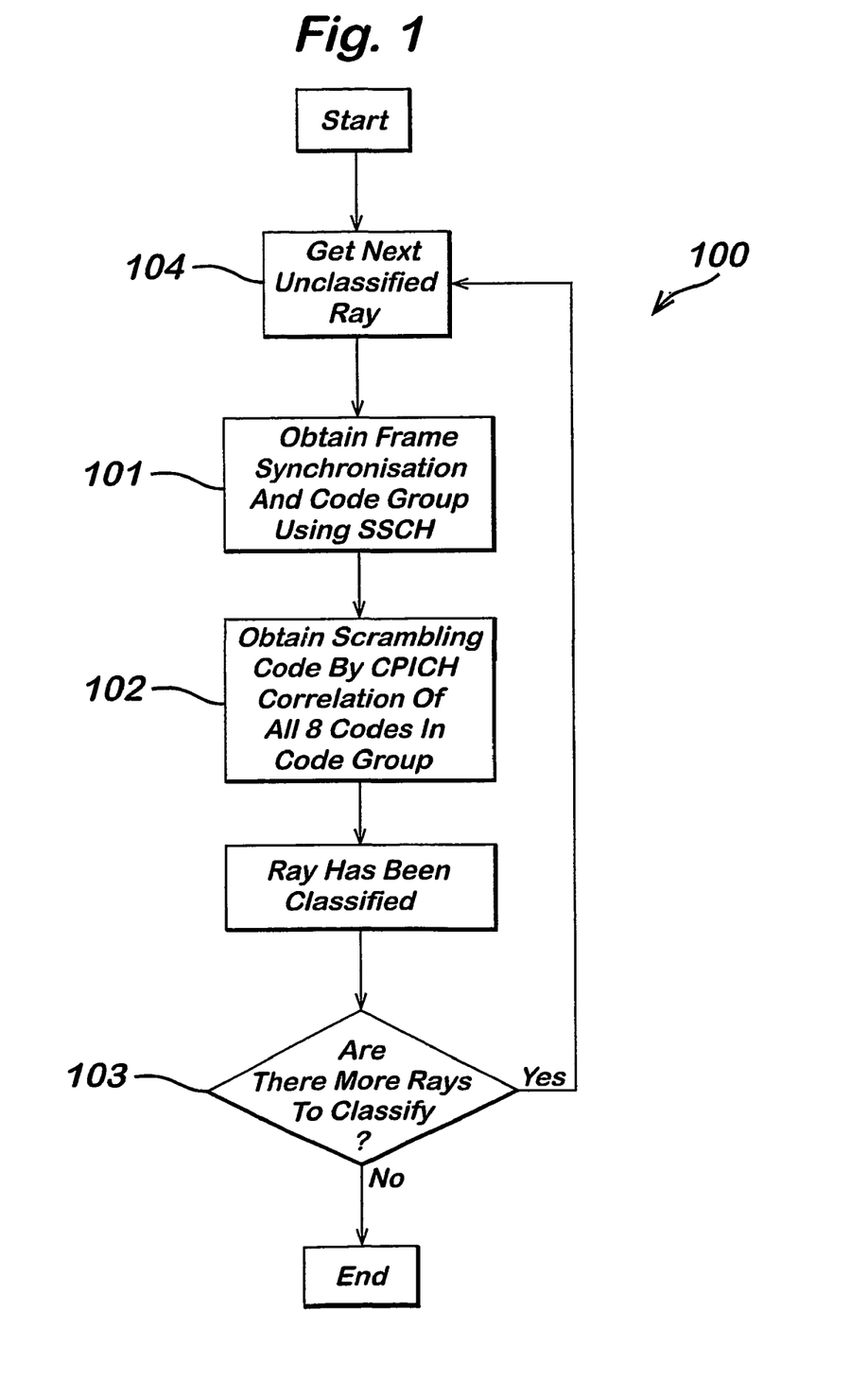
FIG. 1 is a flow chart illustrating a first, prior art, ray classification method.

Determination of the scrambling code and frame and slot timing is known as ray classification. This method of ray classification, hereafter termed blind ray classification since it uses no knowledge of the cells, is slow since data must be accumulated over at least one frame. It also requires a relatively large amount of processor time, because the look-up table is large, which is undesirable in terms of power consumption and in terms of maximising processor sharing flexibility. This method is repeated for each ray which is required to be classified, and is indicated schematically in FIG. 1. Referring to FIG. 1, the method 100 comprises obtaining frame timing and code group information at step 101, and obtaining the scrambling code at step 102. Steps 103 and 104 cause steps 101 and 102 to be repeated for each unclassified ray.

It is proposed for each cell to broadcast a neighbouring cell list on a broadcast channel (BCH). The neighbouring cell list will contain the identity of the scrambling code and the approximate slot timing (to within one slot) of each cell which is in the area surrounding the cell transmitting the BCH. Implicit in this information is the scrambling code group. The BCH channel will have a low data rate and carry large amounts of data, so the neighbouring cell list is not expected to be repeated very often, for example once every five seconds or so.

It is proposed at page 144 of "WCDMA for UMTS" by Antti Toskala and Harri Holma, ISBN 0 471 720518, to assist the blind ray classification method using information concerning the relative timing between cells.

In accordance with a first aspect of the invention, there is provided a method of classifying a ray received at a code division multiple access receiver, the method comprising:
  determining if a timing characteristic of the ray falls within a predetermined range of a timing characteristic of a ray classified to a given cell;
  in response to a positive determination, mixing a received signal with a scrambling code used by the given cell to provide a mixed signal; and
  examining the mixed signal to determine if the ray originates from the given cell.

In accordance with a second aspect of the invention, there is provided apparatus for classifying a ray received at a code division multiple access receiver, the apparatus comprising:
  means for determining if a timing characteristic of the ray falls within a predetermined range of a timing characteristic of a ray classified to a given cell;
  means responsive to a positive determination for mixing a received signal with a scrambling code used by the given cell to provide a mixed signal; and
  means for examining the mixed signal to determine if the ray originates from the given cell.

According to a third aspect of the invention, there is provided a method of classifying a ray received at a code division multiple access receiver, the method comprising:
  (i) determining if a synchronisation sequence of the received ray falls within a predetermined range of a synchronisation sequence of a ray already classified to a selected cell;
  (ii) in response to a positive determination in step (i), correlating a signal from the received ray with a scrambling code used by the selected cell to determine if the ray originates from the given cell.

The following statements do not define the invention but are nevertheless useful for understanding the invention.

There may be provided apparatus for classifying a ray received at a code division multiple access receiver, the apparatus comprising:
  means for receiving a neighbouring cell list comprising at least information concerning scrambling codes used by at least one neighbouring cell;
  means for selecting a scrambling code used by a given neighbouring cell;
  means for mixing a received signal with the selected scrambling code to provide a mixed signal; and
  means for examining the mixed signal to determine if the ray originates from the given neighbouring cell.

There may be provided apparatus for classifying a ray received at a code division multiple access receiver, the apparatus comprising:
  means for receiving a neighbouring cell list comprising at least information concerning scrambling codes used by, and timing information concerning at least one neighbouring cell;
  means for selecting a cell from the neighbouring cell list, the cell having associated therewith one or more scrambling codes;
  means for determining whether the number of cells in the neighbouring cell list exceeds a threshold;

means responsive to a positive determination for attempting to classify the ray to the selected cell without utilising means for mixing a received signal with a scrambling code; and means responsive to a negative determination for mixing a received signal with a scrambling code used by the selected cell to provide a mixed signal, and for examining the mixed signal to determine if the ray originates from the cell.

There may be provided a method of classifying a ray received at a code division multiple access receiver, the method comprising:

receiving a neighbouring cell list comprising at least information concerning scrambling codes used by at least one neighbouring cell;

selecting a scrambling code used by a given neighbouring cell, mixing a received signal with the selected scrambling code to provide a mixed signal; and examining the mixed signal to determine if the ray originates from the given neighbouring cell.

There may be provided a method of classifying a ray received at a code division multiple access receiver, the method comprising:

receiving a neighbouring cell list comprising at least information concerning scrambling codes used by and timing information concerning at least one neighbouring cell;

selecting a cell from the neighbouring cell list, the cell having associated therewith one or more scrambling codes;

determining whether the number of cells in the neighbouring cell list exceeds a threshold;

in response to a positive determination, attempting to classify the ray to the selected cell using scrambling code group information and without mixing a received signal with a scrambling code; and in response to a negative determination, mixing a received signal with a scrambling code used by the selected cell to provide a mixed signal, and examining the mixed signal to determine if the ray originates from the cell.

There may be provided apparatus for classifying a ray received at a code division multiple access receiver, the apparatus comprising:

means for receiving a neighbouring cell list comprising, for each of a plurality of cells, at least timing information and one of a) cell synchronisation code information, and b) information from which cell synchronisation code information can be derived;

means for deriving for at least one cell, if necessary, cell synchronisation code information from the neighbouring cell list;

a demodulator for demodulating a received synchronisation code from the received ray;

means for determining a possible relative phase of a cell synchronisation code, derived from the cell synchronisation code information, for a given cell to the received synchronisation code on the basis of the timing information;

a comparator for comparing at least part of the received synchronisation code with at least a part of the cell synchronisation code from the given cell at the relative phase; and means for determining, on the basis of an output of the comparator, whether the received ray originates from the given cell.

There may be provided a method of classifying a ray received at a code division multiple access receiver, the method comprising:

receiving a neighbouring cell list, comprising for each of a plurality of cells at least timing information and one of a) cell synchronisation code information, and b) information from which cell synchronisation code information can be derived;

deriving for at least one cell, if necessary, cell synchronisation code information from the neighbouring cell list;

demodulating a received synchronisation code from the received ray;

determining a possible relative phase of a cell synchronisation code, derived from the cell synchronisation code information, for a given cell to the received synchronisation code on the basis of the timing information;

comparing at least a part of the received synchronisation code with at least a part of the cell synchronisation code for the given cell at the relative phase;

determining, on the basis of the result of the comparison, whether the received ray originates from the given cell.

Embodiments of the present invention will now be described, by way of example only; with reference to the accompanying drawings, of which.

Figure 2:
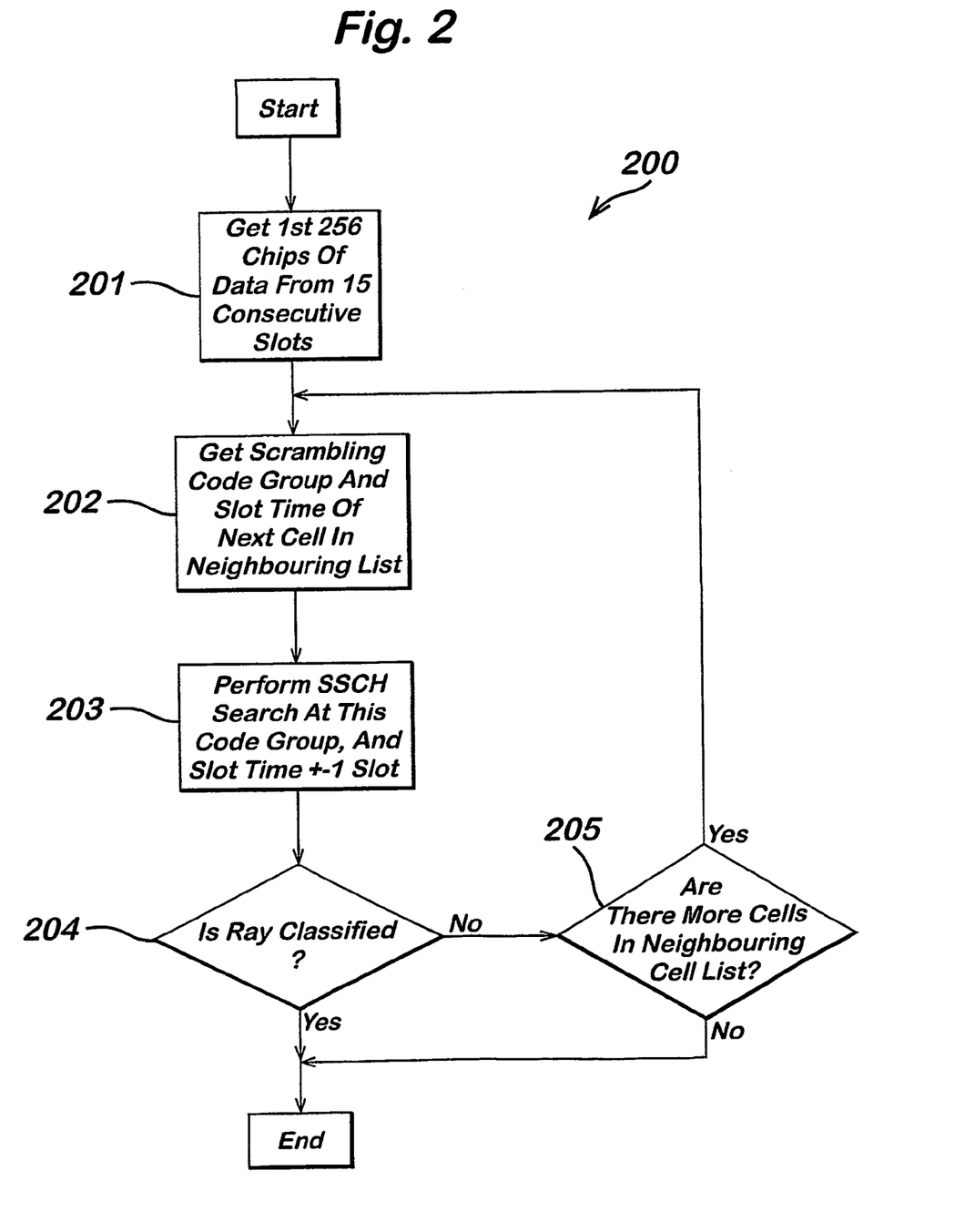
FIGS. 2 and 4 are flow charts illustrating so-called second and fourth ray classification methods which are useful for understanding the invention.

Referring to FIG. 2, a second ray classification method 200 commences with step 201, which comprises obtaining the SSCH Hadamard code sequences received for a candidate ray in a conventional manner, i.e. by demodulation of the received signal. In step 202, the neighbouring cell list received from a cell is examined, and the scrambling code group and slot time are obtained for a cell selected from that list. In step 203, the obtained sequence of SSCs corresponding to the ray is separately compared against the SSCs for the code group of the scrambling code of the selected cell at the central timing offset and at timing offsets one slot either side of the central timing offset. If this does not result in classification of the ray, steps 204 and 205 cause the procedure to be repeated for a different cell. This is performed for each of the cells identified in the neighbouring cell list.

The second method 200 is substantially quicker than the blind ray classification method described above with reference to FIG. 1. Once the SSC sequence has been determined, the blind classification search requires checking the sequence against 64 code groups at fifteen different frame timings, which amounts to 960 checks. Clearly, far fewer checks are required for each cell in the neighbouring cell list using the second method 200. Also, since the number of cells against which a signal is checked is reduced, the second method 200 is more likely to result in correct classification than the blind method.

In a modification of the second method 200, extra confidence in the cell classification is provided. Here, a CPICH check is performed at step 204 only when the SSCH search step 203 yields positive result, to confirm that the scrambling code of the selected cell is the same as that used to modulate the received signal. This CPICH check, put simply, involves correlating a received signal with the scrambling code used by the selected cell, and examining the result. The relative timing of the two signals is set to isolate the unclassified ray using the detected commencement of PSCH bursts to identify the start of a slot, and aligning the scrambling code accordingly. Since CPICH channels carry a known data sequence—it is currently anticipated to be all +1s—it is a simple matter to determine whether the scrambling code corresponding to the selected cell is the same as and is synchronised with the scrambling code on the received signal. Since the frame timing of the ray classified to the selected cell is known, the correlation need only be performed at one of the fifteen possible slot positions.

It will be appreciated that in this embodiment the sequence of SSCs is determined with reference to a look-up table, which relates SSCH sequences to scrambling code groups, from the identification of the scrambling code transmitted as part of the neighbouring cell list. In an alternative embodiment (not shown) the neighbouring cell list includes the sequence of SSCs, or information from which the sequence of SSCs may be determined. Such information may be, for example, the identity of the scrambling code group or similar.

Figure 3:
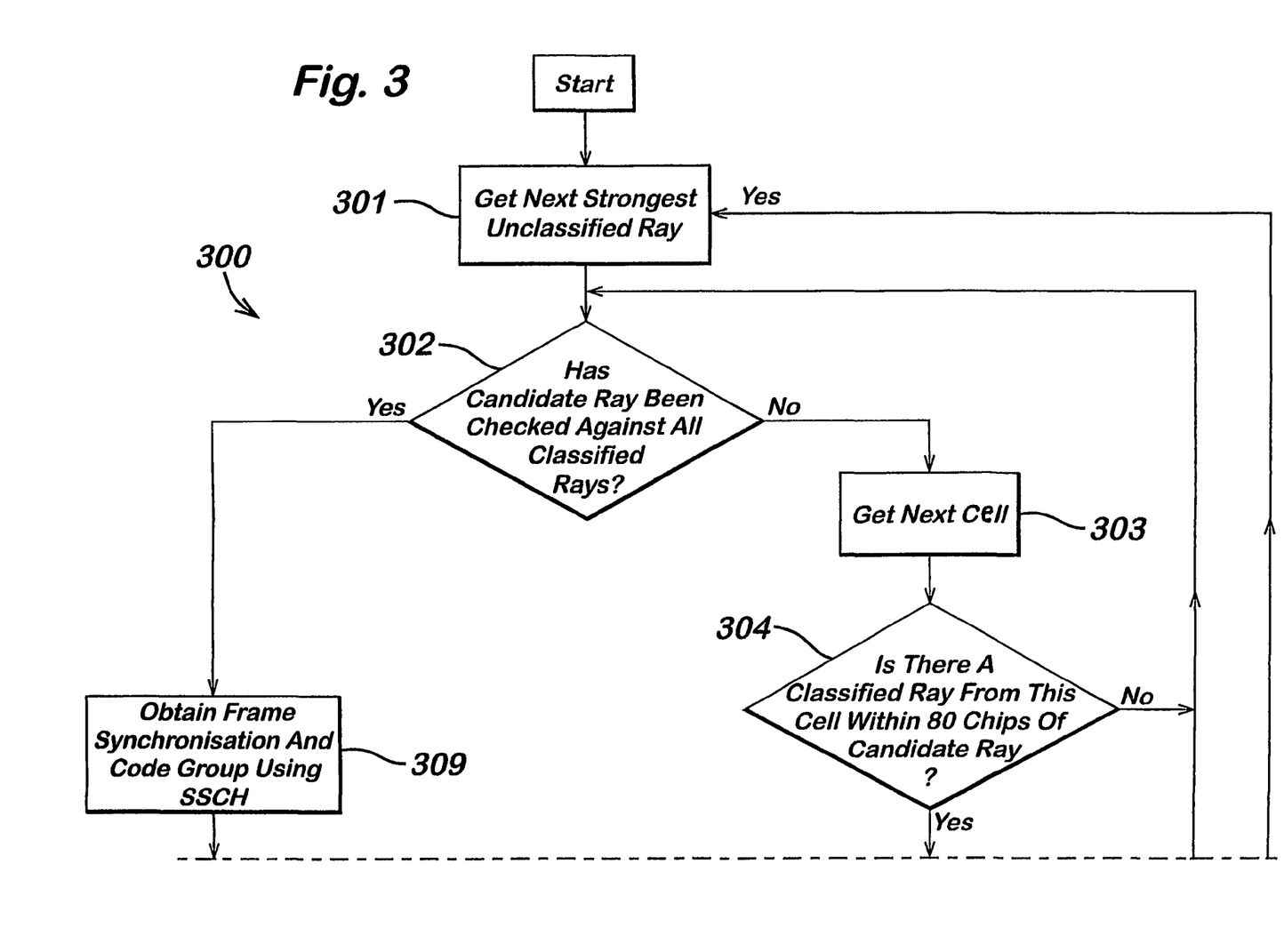
FIG. 3 is a flow chart illustrating a ray classification method, referred to as the third ray classification method, which is in accordance with the invention.

Referring now to FIG. 3, the third method 300 (which is a preferred embodiment of the present invention) starts with step 301 by selecting the unclassified ray which has the highest power. Step 302 then determines whether the unclassified ray has been checked against all classified rays. On first performing the method, the answer to step 302 necessarily is no, so step 303 selects one cell from which a ray has been classified. It is a pre-condition of the third method 300 that at least one ray has been classified, although the method performs better the larger the number of cells from which rays have been classified. At step 304, the rays classified to the selected cell are examined in turn to determine if one of the classified rays has a timing characteristic which falls within 80 chips of the selected unclassified ray. In this embodiment, the timing of the start of PSCH bursts is used to determine the relative timing of the unclassified ray and the classified rays, although other references could be used instead. 80 chips correspond to 21 µs or 6.25 km. If there is a negative determination, the method returns to step 302. If it is determined in step 302 that the unclassified ray has not been checked against all classified rays, step 303 selects a different cell for use by step 304. If step 304 yields a positive determination, step 305 performs a CPICH check using the scrambling code associated with the selected cell. This CPICH check, put simply, involves correlating a received signal with the scrambling code used by the selected cell, and examining the result. The relative timing of the two signals is set to isolate the unclassified ray using the detected commencement of PSCH bursts to identify the start of a slot, and aligning the scrambling code accordingly. Since CPICH channels carry a known data sequence—it is currently anticipated to be all +1s—it is a simple matter to determine whether the scrambling code corresponding to the selected cell is the same as and is synchronised with the scrambling code on the received signal. Since the frame timing of the ray classified to the selected cell is known, the correlation need only be performed at one of the fifteen possible slot positions. Step 306 detects whether the CPICH check produced a positive result, and returns to step 302 or advances to step 307 accordingly. The ray is classified according to scrambling code and frame timing at step 307, then step 308 determines if there are any more unclassified rays. If there are more unclassified rays, the third method 300 returns to step 301. Otherwise, the method ends.

When step 302 determines that an unclassified ray has been checked against all classified rays, steps 309 and 310 are invoked to classify the ray. Steps 309 and 310 constitute a blind ray classification, as is described above with reference to FIG. 1, after which the ray is classified in step 307.

The third method results in ray classification in a shorter time than the blind ray classification method described above, since with the third method it is not necessary to decode the SSCH for fifteen consecutive slots, which equates to 36,096 chips.

Performing a CPICH check, on the other hand, can require only the first 512 chips of a slot. The third method also requires less processor time, since the complexity of an SSCH search and subsequent code group identification is significantly higher than the complexity of a single CPICH check. Furthermore, since the CPICH channel is transmitted at a higher power level than the PSCH and SSCH channels, the third method is more likely to classify a ray to its cell than the blind ray classification method or the second method described above.

Numerous variations on the third method 300 are possible. For example, a signal corresponding to a candidate ray could be checked against a channel other than the CPICH channel. The broadcast channel (BCH), for example is suitable for this, since data modulated onto this channel at a low rate and the channel is modulated with a known OVSF code (OVSF code number 1). CPICH checking is preferred since the CPICH channel is expected to be transmitted at a higher power level than the BCH channel. Using the results from two channels, such as a BCH channel and a CPICH channel, checked simultaneously or sequentially, provides an increased probability of ray classification if the ray does originate from the cell being checked against. The third method may be implemented in hardware, in software or in a combination of hardware and software.

Figure 4:
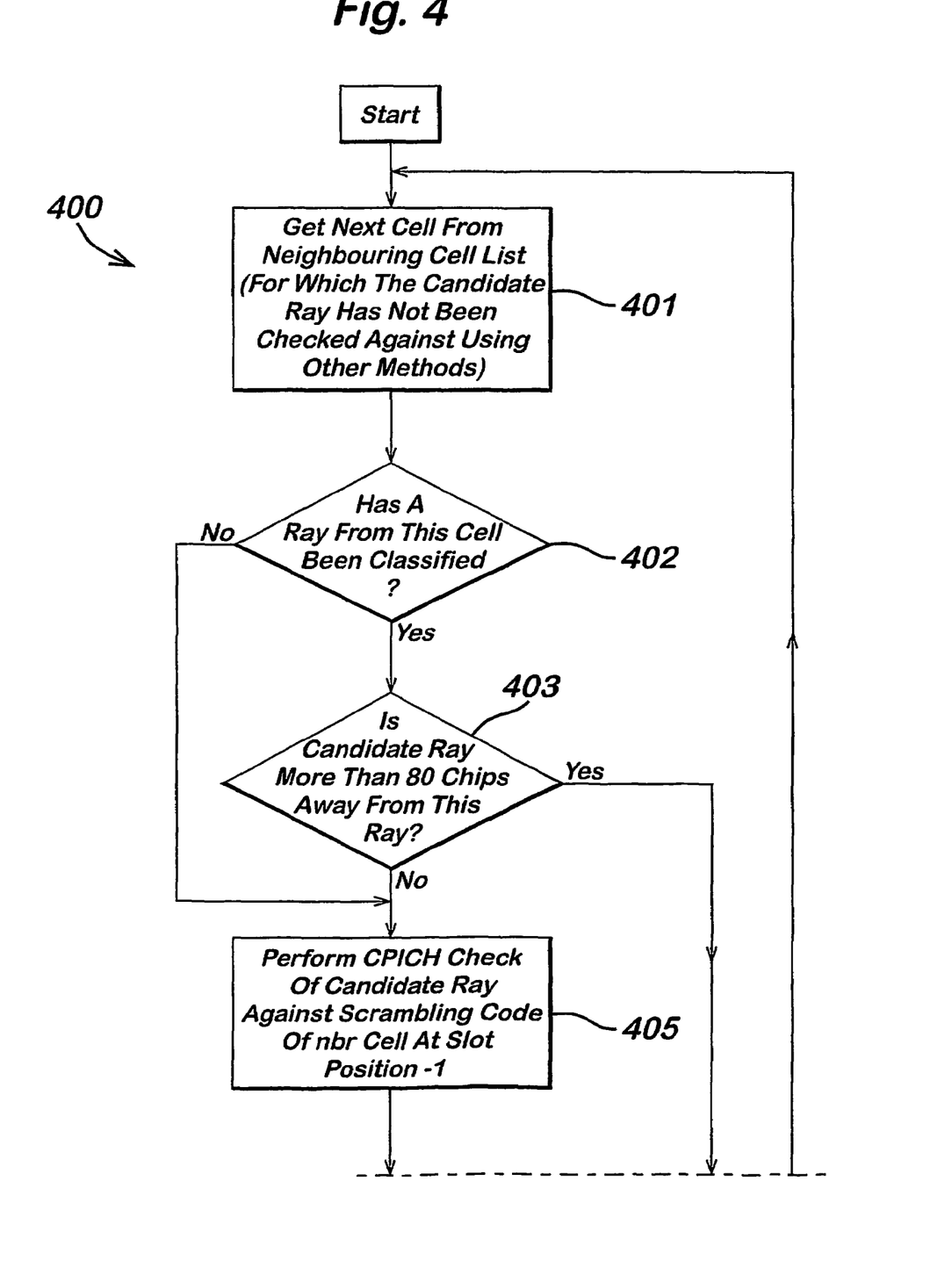

Referring now to FIG. 4, the fourth method 400 starts with a number of unclassified rays, arranged in descending order according to power, and a number of classified rays. A neighbouring cell list is decoded from the BCH channel received from a cell which the UE is listening to. It is not necessary for the UE to be in communication with a node B, although this is likely to be the case in practise.

The candidate ray having the highest power is selected, and a cell is then selected from the neighbouring cell list in step 401. It is then determined whether or not one of the classified rays originates from the cell selected in step 402. If the answer is affirmative, step 403 examines the relative timing of the strongest ray which has been classified to the selected cell to the candidate ray, and determines whether the two rays are separated by more than 80 chips of the scrambling code, which equates to 21 µs or 6.25 km. In this embodiment, the timing of the start of PSCH bursts is used to determine the relative timing of the unclassified ray to the classified ray, although other references could be used instead. If the answer to step 403 is affirmative, it is assumed that the candidate ray is not from the selected cell, and the method 400 proceeds to step 404.

If in step 402 it is determined that no rays from the selected cell have been classified, a CPICH check is performed on the candidate ray in step 405 with the scrambling code being one slot earlier than the expected timing of the scrambling code. The CPICH check put simply involves correlating a received signal with the scrambling code used by the selected cell, and examining the result. The relative timing of the two signals is set to isolate the unclassified ray using the detected commencement of PSCH bursts as the start of a slot, and aligning the scrambling code accordingly. Since CPICH channels carry a known data sequence—it is currently anticipated to be all +1s—it is a simple matter to determine whether the scrambling code corresponding to the selected cell is the same as and is synchronised with the scrambling code on the received signal. If the result of step 405 is affirmative, i.e. the scrambling code and its timing is correct, then the candidate ray is classified according to that code and that frame timing in step 406, and the method 400 then proceeds to the end. If the result of step 405 is negative, then a CPICH check is performed in step 407 with relative timing equal to that expected. If in step 408 it is determined that the scrambling code and its timing is correct, then the candidate ray is classified, and the method 400 proceeds to the end. Otherwise, a third CPICH check is performed in step 409 with the scrambling code delayed one slot compared to the expected timing of the scrambling code. If the result is affirmative, the ray is classified accordingly in step 410, and the method proceeds to the end. Otherwise, it is determined in step 404 if there are any more cells in the neighbouring cell list which have not been tried for the candidate ray. If there are more cells, the method is recommenced at step 401 where a new cell is selected from the neighbouring cell list. If there are no more cells, then the method proceeds to the end, and the candidate ray requires classification by another method if it is to be classified.

The fourth method results in ray classification in a shorter time than the blind ray classification method described above, since with the fourth method it is not necessary to decode the SSCH for fifteen consecutive slots, which equates to 36,096 chips. Performing a CPICH check, on the other hand, can require only the first 512 chips of a slot. The fourth method also requires less processor time, since the complexity of an SSCH search and subsequent code group identification is significantly higher than the complexity of a CPICH check. Furthermore, since the CPICH channel is transmitted at a higher power level than the PSCH and SSCH channels, the fourth method is more likely to classify a ray to its cell than the blind ray classification method or the second method described above.

Numerous variations on the fourth method 400 are possible. For example, a signal corresponding to a candidate ray could be checked against a channel other than the CPICH channel. The BCH channel, for example, is suitable for this since data modulated onto this channel at a low data rate and the channel is modulated with a known OVSF code (OVSF code number 1). CPICH checking is preferred since the CPICH channel is expected to be transmitted at a higher power level than the BCH channel. Using the results from two channels, such as a BCH channel and a CPICH channel, checked simultaneously or sequentially provides an increased probability of ray classification if the ray does originate from the cell being checked against. If it is not possible to identify the scrambling code used by a cell from the neighbouring cell list, the method 400 may be required to be repeated using different scrambling codes. If the neighbouring cell list does not contain timing information, then the method 400 may need to be modified to allow CPICH checks at each of the fifteen possible relative timings. The fourth method may be implemented in hardware, in software or in a combination of hardware and software.

Figure 5:
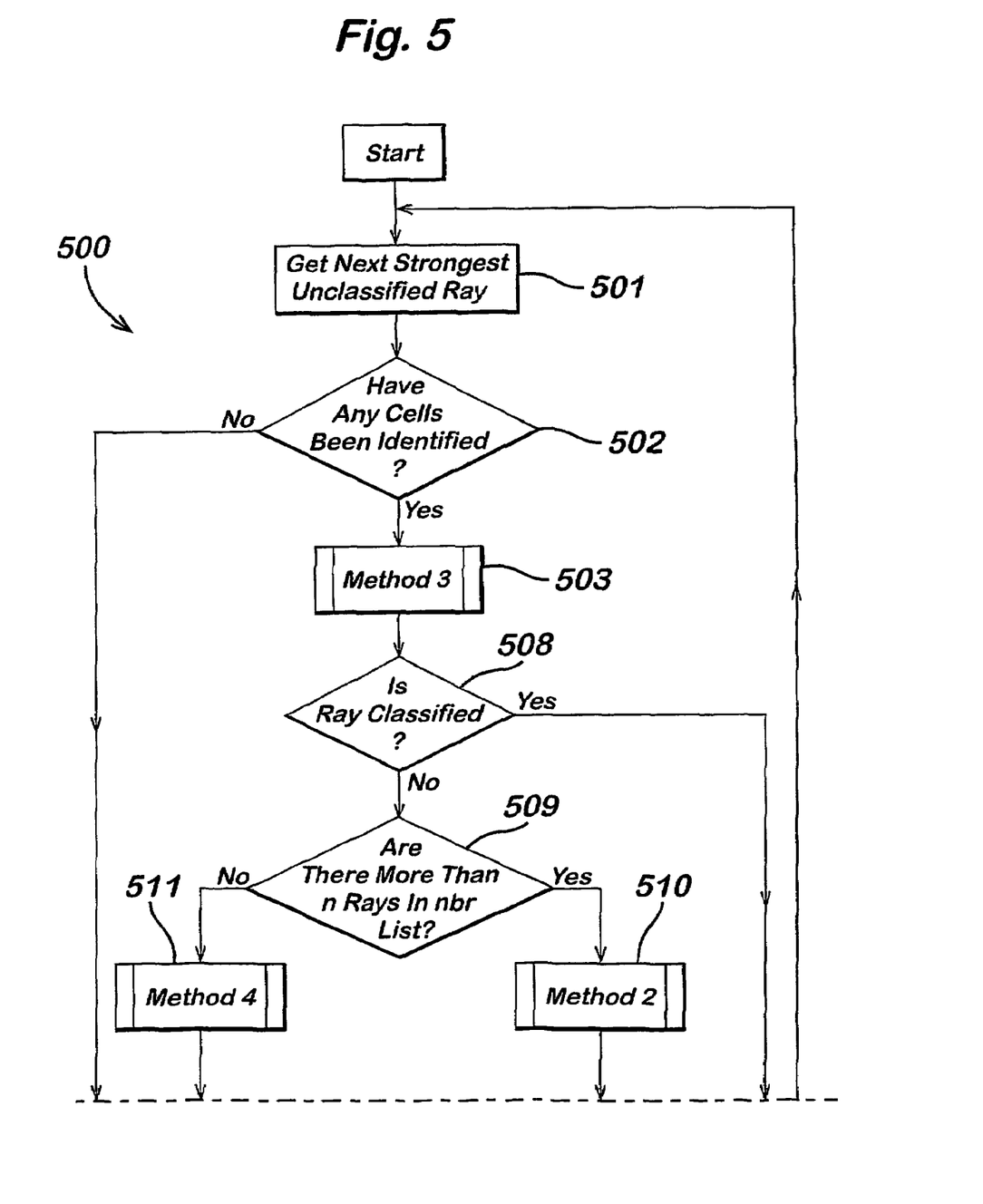
FIG. 5 is a flow chart illustrating a further ray classification method.

FIG. 5 is a flow chart illustrating a further ray classification method. Referring to FIG. 5, the method 500 commence, then selects at step 501 the strongest unclassified ray. On subsequent runs, the step 501 comprises selecting the next strongest unclassified ray. At step 502, it is determined whether any rays have so far been classified. If the answer is yes, then the method 500 proceeds to step 503. If the answer is no, which may occur for example on power-up of a mobile telephone, step 504 causes a blind ray classification check to be made on the ray. Blind ray classification is described above with reference to FIG. 1. If the ray is not able to be classified in this way, step 506 asks if there are any more unclassified rays, and returns to step 501 or ends the method 500 accordingly. If the ray is classified, the classification data is stored at step 507 before the method proceeds to step 506.

At step 503, the attempt is made to classify the ray using steps 302, 303, 304, 305 and 306 of the third method 300, described above with reference to FIG. 3. If in step 508 it is determined that the ray was classified by this, then the method 500 proceeds to step 507, where the classification data is stored Otherwise, the method 500 proceeds to step 509.

At step 509, the method 500 detects the number of cells that appear in a neighbouring cell list which is received from a cell over a BCH channel. The number of neighbouring cells is compared to a threshold N, and the method 500 proceeds to step 510 if the threshold is exceeded, or proceeds to step 511 otherwise. Step 510 comprises the second method 200, described above with reference to FIG. 2. Step 511 comprises the fourth method 400 described above with reference to FIG. 4.

If the ray becomes classified by whichever of steps 510 and 511 were implemented, then step 512 causes the method 500 to pass to step 507, where the classification data is stored. Otherwise, the method passes to step 504 where blind classification of the ray is attempted.

The value of the threshold N is hardwired into the apparatus which implements the method. This invention may be implemented in hardware, software or in a combination of hardware and software. The value of the threshold is selected dependent on a number of factors including the required speed of ray classification, processor speed and processor availability. It will be appreciated that the fourth method 400 requires less time to check a ray than the second method 200, unless there are a large number of cells in the neighbouring cell list since less time is required to acquire the necessary data. Also, the amount of processing required to implement the fourth method 400 increases greatly as the number of cells in the neighbouring cell list increases, although this is not true of the second method. In another embodiment, the value of the threshold is dynamically adjustable by a controller (not shown).

The invention claimed is:

1. A method of classifying a ray received at a code division multiple access receiver, wherein the ray has a primary synchronization channel on which a known primary synchronization code is transmitted, the method comprising:
   determining if a timing of the primary synchronization channel of the ray falls within a predetermined range of a timing of the primary synchronization channel of a ray classified to a given cell;
   in response to a positive determination, mixing a received signal, which is different than that provided by the primary synchronization channel, with a scrambling code used by the given cell to provide a mixed signal; and
   examining the mixed signal to determine if the ray originates from the given cell.

2. A method according to claim 1, further comprising, if examination of the mixed signal results in a determination that the ray does not originate from the given cell, repeating the determining and mixing steps with respect to a ray classified to a different cell.

3. A method according to claim 1 or claim 2, further comprising determining if the unclassified ray has been checked against all classified rays; and, in response to a positive determination, performing a blind ray classification.

4. A method according to claim 1, wherein the received signal has known content.

5. A method according to claim 4, wherein the received signal is the common pilot channel (CPICH) of the received ray.

6. A method according to claim 1, wherein the received signal has known modulation.

7. A method according to claim 6, wherein the received signal is the broadcast channel (BCH) of the received ray.

8. Apparatus for classifying a ray received at a code division multiple access receiver, wherein the ray has a primary synchronization channel on which a known primary synchronization code is transmitted, the apparatus comprising:
 means for determining if a timing of the primary synchronization channel of the ray falls within a predetermined range of a timing of the primary synchronization channel of a ray classified to a given cell;
 means responsive to a positive determination for mixing a received signal, which is different than that provided by the primary synchronization channel, with a scrambling code used by the given cell to provide a mixed signal; and
 means for examining the mixed signal to determine if the ray originates from the given cell.

9. Apparatus according to claim 8, further comprising means responsive to a negative determination from the examining means for selecting a different cell and for processing the unclassified ray with respect to the different cell.

10. Apparatus according to claim 8 or claim 9, further comprising means for determining if the unclassified ray has been checked against all classified rays, and means responsive to a positive determination for performing a blind ray classification.

11. An apparatus according to claim 8, wherein the received signal has known content.

12. An apparatus according to claim 11, wherein the received signal is the common pilot channel (CPICH) of the received ray.

13. An apparatus according to claim 8, wherein the received signal has known modulation.

14. An apparatus according to claim 13, wherein the received signal is the broadcast channel (BCH) of the received ray.

15. A method of classifying a ray received at a code division multiple access receiver, wherein the ray has a primary synchronization channel on which a known primary synchronisation code is transmitted, the method comprising:
 (i) determining if a synchronisation sequence of the received ray falls within a predetermined range of a synchronization sequence of a ray already classified to a selected cell;
 (ii) in response to a positive determination in step (i), correlating a signal which is different than that provided by the primary synchronization channel of the ray, from the received ray with a scrambling code used by the selected cell to determine if the ray originates from the given cell;
 wherein the synchronization sequence of the received ray and the classified ray is provided by the primary synchronization channel of the respective ray.

16. A method according to claim 15, wherein step (i) comprises determining if the start of the synchronisation sequence of the received ray is within 80 chips of the start of the synchronisation sequence of the classified ray.

17. A method according to any of the claims 15 and 16, wherein, in the event of a negative determination in step (i), the method further comprises repeating step (i) with respect to a ray classified to a different cell until either a positive determination is made, or there are no more classified rays available.

18. A method according to claim 15, wherein the received signal has known content.

19. A method according to claim 18, wherein the received signal is the common pilot channel (CPICH) of the received ray.

20. A method according to claim 15, wherein the received signal has known modulation.

21. A method according to claim 20, wherein the received signal is the broadcast channel (BCH) of the received ray.

* * * * *